United States Patent
Toth (10) Patent No.: US 9,256,032 B2
(45) Date of Patent: *Feb. 9, 2016

(54) GLOBAL LINK CONNECTOR SYSTEM

(75) Inventor: John R. Toth, Clermont, FL (US)

(73) Assignee: Deeplinc, Inc., Clermont, FL (US)

( * ) Notice: Subject to any disclaimer, the term of this patent is extended or adjusted under 35 U.S.C. 154(b) by 705 days.

This patent is subject to a terminal disclaimer.

(21) Appl. No.: 13/527,736

(22) Filed: Jun. 20, 2012

(65) Prior Publication Data

US 2013/0094810 A1 Apr. 18, 2013

Related U.S. Application Data

(63) Continuation of application No. 12/628,190, filed on Nov. 30, 2009, now Pat. No. 8,226,303.

(51) Int. Cl.
*G02B 6/38* (2006.01)
*H01R 13/523* (2006.01)
*H01R 13/453* (2006.01)

(52) U.S. Cl.
CPC ............ *G02B 6/3816* (2013.01); *H01R 13/523* (2013.01); *G02B 6/389* (2013.01); *G02B 6/3817* (2013.01); *H01R 13/4532* (2013.01)

(58) Field of Classification Search
None
See application file for complete search history.

(56) References Cited

U.S. PATENT DOCUMENTS

| | | | |
|---|---|---|---|
| 3,821,690 A | 6/1974 | Small | |
| 4,073,562 A | 2/1978 | Karlskind | |
| 4,174,875 A | 11/1979 | Wilson et al. | |
| 4,192,569 A | 3/1980 | Mucci | |
| 4,363,168 A | 12/1982 | Bryer et al. | |
| 4,589,717 A | 5/1986 | Pottier et al. | |
| 4,666,242 A | 5/1987 | Cairns | |
| 4,682,848 A | 7/1987 | Cairns et al. | |
| 4,795,359 A | 1/1989 | Alcock et al. | |
| 4,948,377 A | 8/1990 | Cairns | |
| 5,203,805 A | 4/1993 | Cairns | |
| 5,645,438 A | 7/1997 | Cairns | |
| 5,645,442 A | 7/1997 | Cairns | |
| 5,685,727 A | 11/1997 | Cairns | |
| 5,722,842 A | 3/1998 | Cairns | |
| 5,738,535 A | 4/1998 | Cairns | |
| 5,838,857 A | 11/1998 | Niekrasz | |
| 5,899,765 A | 5/1999 | Niekrasz et al. | |
| 6,017,227 A | 1/2000 | Cairns et al. | |
| 6,095,838 A | 8/2000 | Brickett | |
| 6,315,461 B1 | 11/2001 | Cairns | |
| 6,332,787 B1 | 12/2001 | Barlow et al. | |
| 6,464,405 B2 | 10/2002 | Cairns et al. | |
| 6,511,335 B1 | 1/2003 | Rayssiguier et al. | |
| 6,561,268 B2 | 5/2003 | Jones | |
| 6,736,545 B2 | 5/2004 | Cairns et al. | |
| 6,783,379 B2 | 8/2004 | Kerscher et al. | |
| 6,789,952 B2 | 9/2004 | Lancelle | |
| 6,910,910 B2 | 6/2005 | Cairns | |
| 6,929,404 B2 | 8/2005 | Jones et al. | |
| 6,932,636 B2 | 8/2005 | Abbey et al. | |

(Continued)

*Primary Examiner* — Tina Wong
(74) *Attorney, Agent, or Firm* — Greenberg Traurig, LLP (57) ABSTRACT

A connector mating system that can enable the coupling and decoupling of electrical or optical communications channels, while in a deep, sub-oceanic, sea-floor environments, during which time the contacting interfaces of the said channels remain fully protected from the destructive effects of the said environment. The system features a Wet-Mate Connector (WMC) that provides a means for electrical, optical and hybrid interconnection within an extremely hostile environments.

19 Claims, 11 Drawing Sheets

(56) References Cited

U.S. PATENT DOCUMENTS

| | | |
|---|---|---|
| 7,004,638 B2 | 2/2006 | Nicholson |
| 7,074,064 B2 | 7/2006 | Wallace |
| 7,112,080 B2 | 9/2006 | Nicholson |
| 7,341,457 B2 | 3/2008 | Lagathu et al. |
| 7,344,316 B2 | 3/2008 | McKinnon |
| 7,409,127 B1 * | 8/2008 | Hurley et al. ............ 385/101 |
| 7,462,054 B2 | 12/2008 | Cairns et al. |
| 7,942,588 B2 * | 5/2011 | Durand et al. ............ 385/77 |
| 8,226,303 B2 * | 7/2012 | Toth ............ 385/70 |
| 2002/0102066 A1 | 8/2002 | Nishita |
| 2006/0160430 A1 | 7/2006 | Siddiqi et al. |
| 2006/0263011 A1 * | 11/2006 | Chen et al. ............ 385/75 |
| 2009/0080836 A1 | 3/2009 | Cairns et al. |
| 2009/0080837 A1 | 3/2009 | Baxter et al. |
| 2011/0129187 A1 * | 6/2011 | Toth ............ 385/70 |

* cited by examiner

GLOBAL LINK CONNECTOR SYSTEM

This application is a continuation of U.S. patent application Ser. No. 12/628,190 filed Nov. 30, 2009 now U.S. Pat. No. 8,226,303, the entire disclosure of which is incorporated herein by reference.

This application includes material which is subject to copyright protection. The copyright owner has no objection to the facsimile reproduction by anyone of the patent disclosure, as it appears in the Patent and Trademark office files or records, but otherwise reserves all copyright rights whatsoever.

FIELD OF THE INVENTION

The present invention relates to systems and methods for electrical or optical connectors, and more specifically, to electrical or optical connectors for connections in deep oceanic environments.

BACKGROUND OF THE INVENTION

Driven by cost factors, as well as the need to overcome the hazards and complexities associated with joining and switching of multi-circuit cables in deep oceanic environments, the industry was first introduced to Wet-Mateable Connectors (WMC) in the early 1960's. The earliest systems enabled the mating of electrical contacts, in an undersea environment through the use of electrical contacts protected by a dense grease medium, which was then expelled during the process of connection. This wet-connection capability made possible more complex system architectures, but was limited by the inability to disconnect or to reconnect such circuits in underwater conditions.

By the 1970's the next phase of under-sea connector development brought to market, commercially viable and fully wet-mateable electrical connection mechanisms. These connectors offered the operator the ability to repeatedly plug and unplug electrical connections, in deeply submerged conditions, either by the manual manipulations of divers, or with the aid of (later developed) submersible, remote operated Vehicles (roVs), linked by control cables to a surface maintenance vessel. This technological advancement provided significantly enhanced system flexibility and made possible the development of large-scale, localized under-sea networks which had not previous been possible.

In the 1980's wet-mate connector technology was extended to single-channel, fiber-optic, and hybrid (electric-optic) applications. Then later, in the 1990's, multichannel electric and "Joined Chamber" multi-channel fiber-optic and hybrid (electric-optic) connectors were introduced. Within several years, this technology became commercially viable, to where multi-channel electric, optic and electric-optic hybrid WMC configurations were marketed by several suppliers.

SUMMARY OF THE INVENTION

In one embodiment, the invention is a connector set comprising a plug having a front oil chamber and a secondary oil chamber having electrical or optical contacts and a receptacle having a front oil chamber and a secondary oil chamber having electrical or optical contacts, the receptacle being adapted to receive the plug. The front oil chamber in the plug and the front oil chamber of the receptacle are used for mechanically engaging the plug and the receptacle, and the secondary oil chamber in the plug and the secondary oil chamber in the receptacle are used for isolation and contact engagement of the electrical or optical contacts of the plug with the electrical or optical contacts of the receptacle.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 2 illustrates a series of descriptive drawings of the principle internal mechanisms of one embodiment of the connector set proper, in which:

FIG. 2b illustrates a series of longitudinal section views of one embodiment of the plug and receptacle connector set, which describes the behavior of the various internal components during stages of the connector set engagement process, and depicting this progression of events from top (fully disengaged), to bottom (fully engaged).

FIG. 2c illustrates a diagrammatic representation of one embodiment of the sequential stages of action which occur during the mating process, and describing in particular, the behavior of the plug and receptacle interfaces, in relation to the progress of travel of a typical plug contact.

FIG. 2g illustrates of one embodiment of a representation of a push-seal element which functions to isolate fluid-filled cavities of the plug or receptacle assemblies, but which can be penetrated by either electric or optic plug assembly contacts.

FIG. 2h illustrates of one embodiment of a representation of the automatic shutoff valve located at the end of the shaft of the plug interface plate, and a description of its manner of operation.

FIG. 3 illustrates a series of descriptive drawings which is intended to identify the principle components and features of the coupling system element of one embodiment of this connector set concept, in which:

FIG. 3a illustrates a series of longitudinal section views of one embodiment of the plug-mounted connector coupling mechanism, which describes the behavior of the various internal components during stages of the connector set engagement process, and depicting this progression of events from top (fully disengaged), to middle (fully engaged), to bottom (coupling separation by a retraction of the coupling ring).

FIG. 3b illustrates a descriptive representation of one embodiment of the Coupling ring latching mechanism as it appears in both its engage and disengaged attitudes.

FIG. 3c illustrates a pictorial representation of the manner in which the castlated teeth of one embodiment of the plug-mounted castlated ring and the receptacle shell are made to engage and secure.

FIG. 3d illustrates of one embodiment of a "flat-projected" diagrammatic representation of the relationship between the Coupling ring, the Castlated ring and the receptacle shell, described sequentially during both the mating and separation process.

DETAILED DESCRIPTION

The basic operating concept for the mechanical interface of one embodiment of the connector system is illustrated in FIG. 2c, and is described in four sequential drawings. In the first drawing to the left, the scalloped discs represent the plug interface component 1 (far disc) and the receptacle interface component 2 (near disc). The two discs are shown separated, as in a position poised to mate. The plug interface disc 1, in this representation, is still positively seated into the interface end wall of the plug assembly, within an aperture of identical profile geometry. In like manner, The receptacle interface disc 2, in this representation, is still positively seated into the interface end wall of the Receptacle assembly, also within an aperture of identical profile geometry.

A mating force, applied to both the Plug and Receptacle assemblies, next brings the two interface components together (as represented in the illustration next, to the right). The joining of the two interface discs automatically locks these components together in such manner that their rotational attitudes will remain perfectly aligned throughout the entire mating, mated and dis-mating process. At the same time, the interfacing rims of the plug interface shell (insert shell cap 66) and the receptacle shell 5, are joined to form a fluid-tight seal so as to prevent intermixing of surrounding seawater with the pressure compensating fluids contained within the Plug and Receptacle assemblies. To this point, each extreme extension of the scalloped profile (the crests of the profiles), is positioned to be located directly in the path of a plug contact. As the compressive force between the plug and receptacle is then increased, the joined Interface discs are made to displace, together, into the forward cavity of the receptacle assembly.

During this displacement travel, the shaft of the receptacle interface component 2, is cammed into rotating as depicted in the third illustration of this drawing set. The interlocked condition of the two interface plates (plug and receptacle) assures that both of these components are made to rotate together, in perfect coincidence. The consequent effect of this rotation is to then shift the profile crests to one side, and to thereby allow a clear travel path for the plug contacts, as the compression of the plug and receptacle assemblies continues beyond the travel limits of the Interface discs 1, 2, into a full-mated condition. Upon complete mating of the plug and receptacle assemblies, The coupling mechanism is enabled to fully engage, securing the plug and receptacle assemblies together until separation is achieved by retraction of the coupling Ring 6.

Receptacle Assembly

Figure 1A:
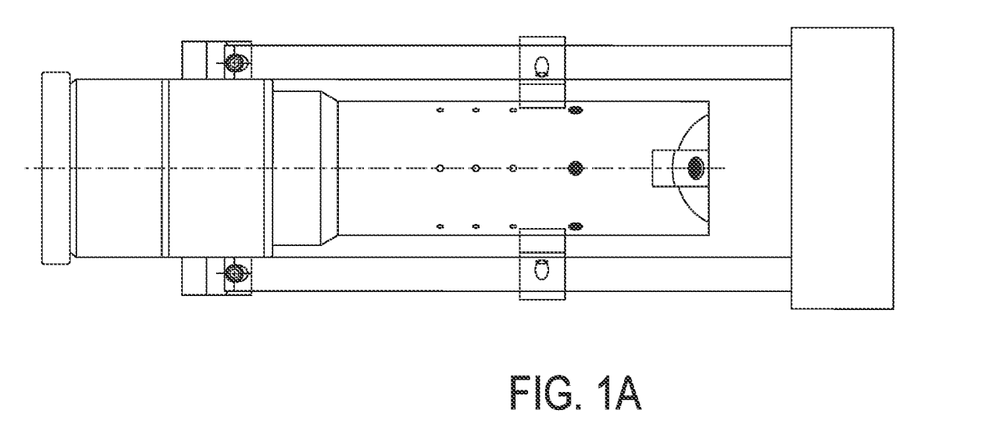
FIG. 1 illustrates a series of external profile views of one embodiment of a connector set in which the plug and related receptacle are independently represented.
Figure 1B:
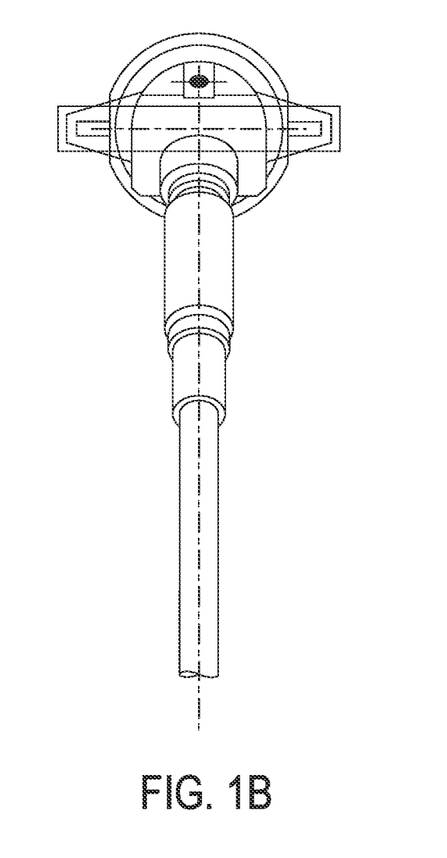
Figure 1C:
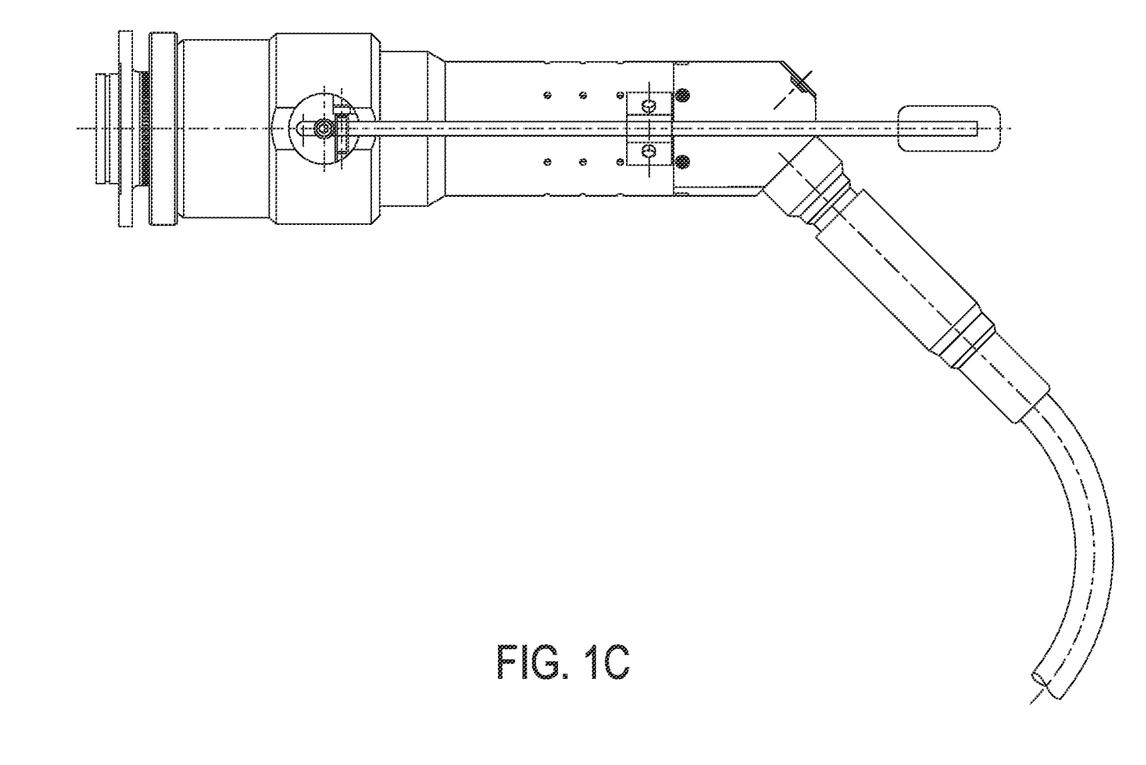
Figure 1D:
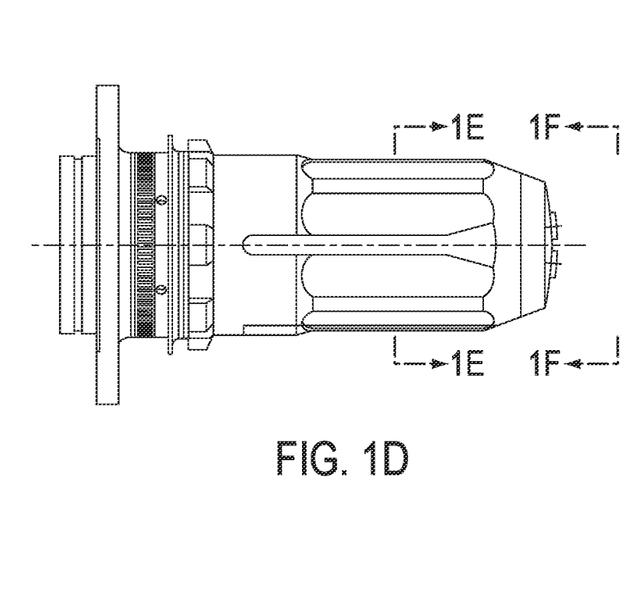
Figures 1E, 1F:
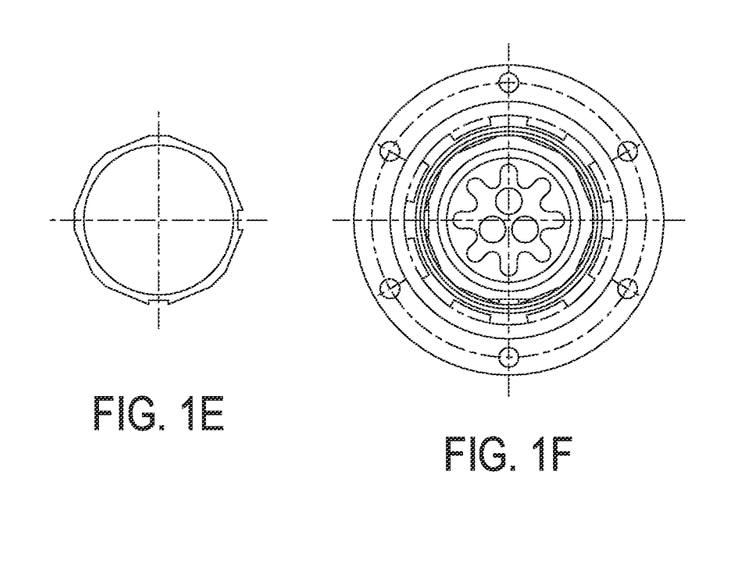
Figure 2A:
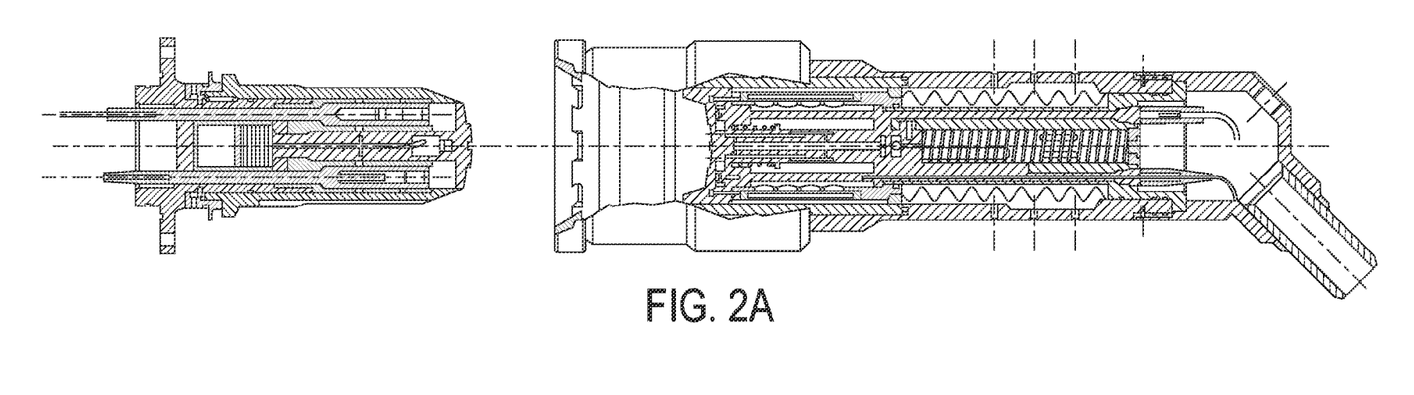
FIG. 2a illustrates a longitudinal section view of one embodiment of the complete plug and receptacle system, including numerical identifications of the various components and features of the internal mechanisms.
Figure 2B:
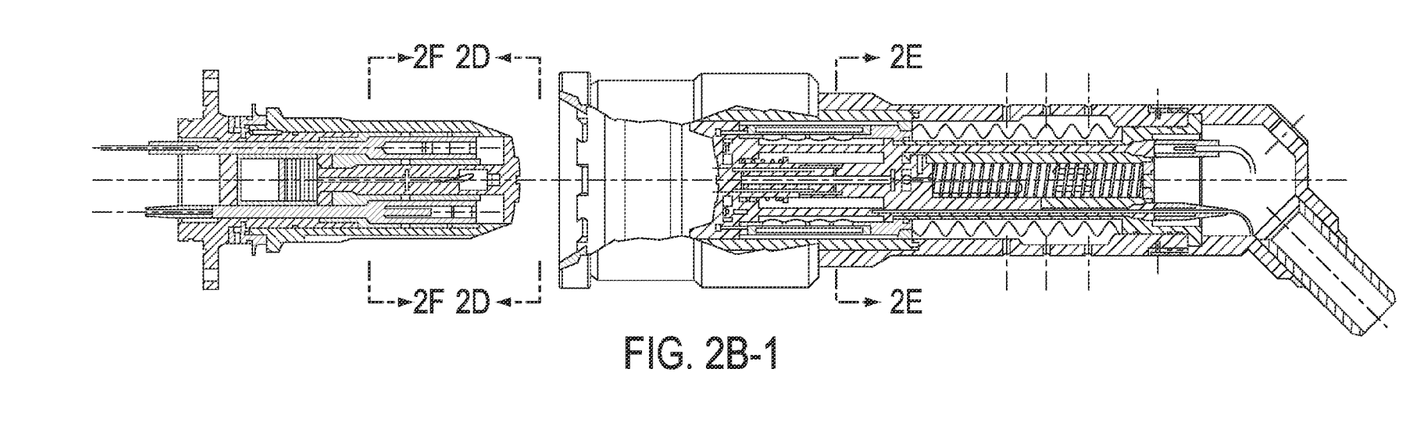
Figure 2B:
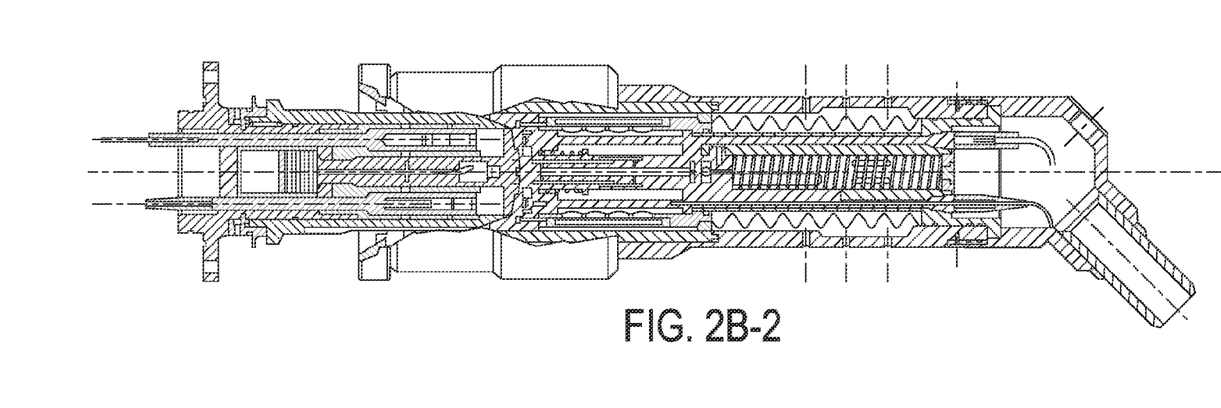
Figure 2B:
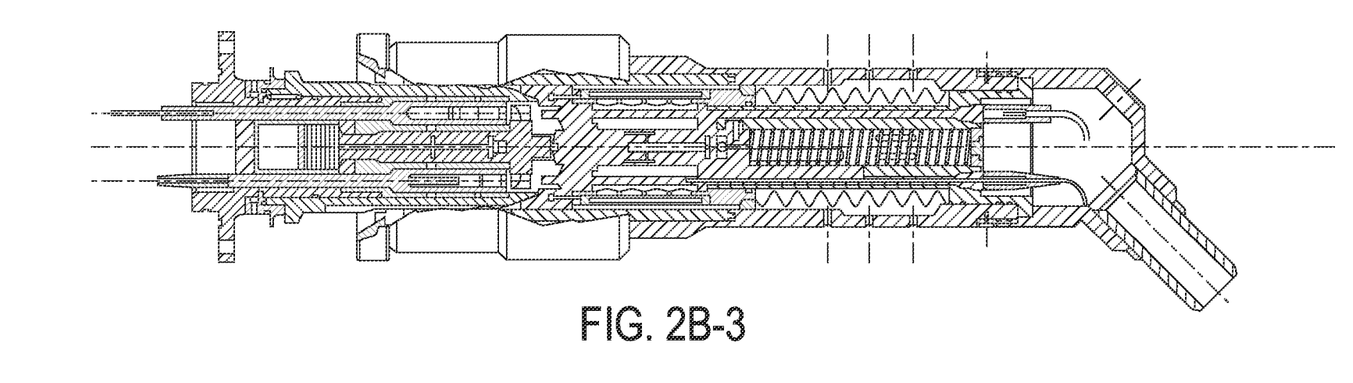
Figure 2B:
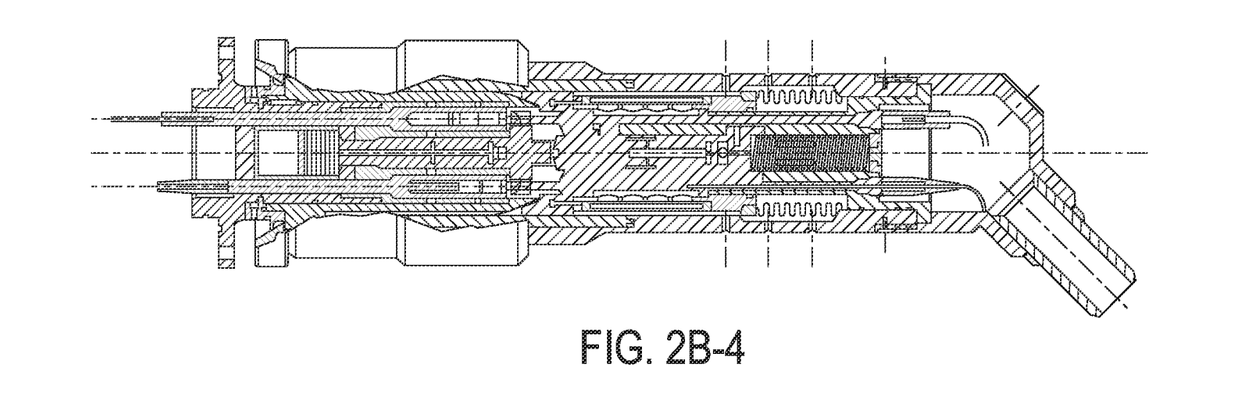
Figure 2C:
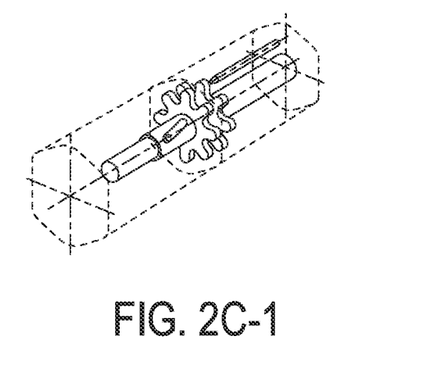
Figure 2C:
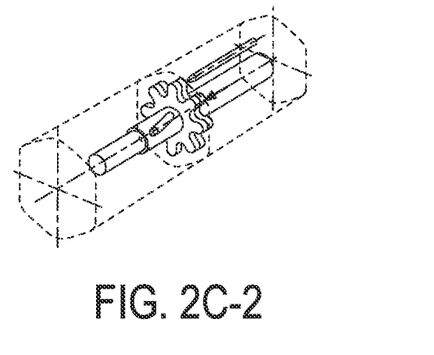
Figure 2C:
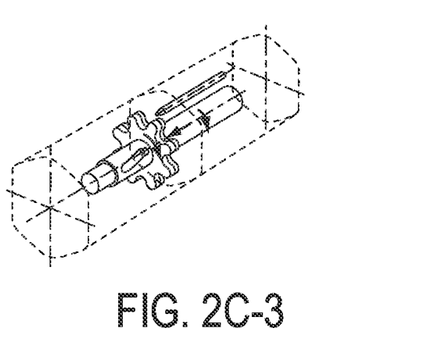
Figure 2C:
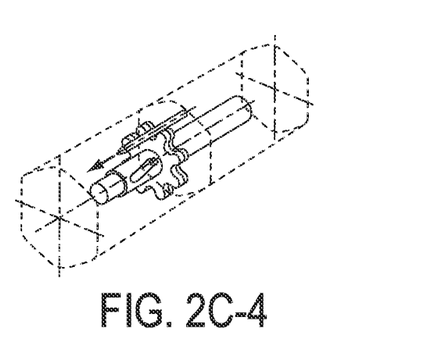
Figure 2D:
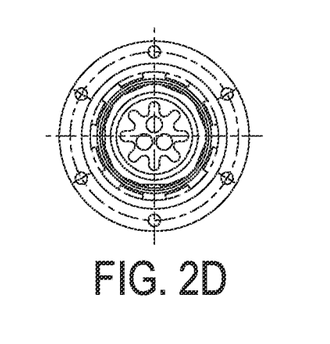
FIG. 2d illustrates one embodiment of a direct view of the example receptacle interface end.

With reference to FIG. 2a, and more specifically to the longitudinal section view of the receptacle assembly, in one embodiment, the structure is composed of a receptacle shell 5 which houses an insert 7, which insert is installed in fixed orientation to the plug/receptacle alignment guide slot 12. This orientation is achieved and secured by the alignment of the receptacle shell 5 with the flange shell 4, by means of the alignment pin 53, and the alignment of the flange shell 4 with the insert 7 as a result of the common intrusion of the electric and/or optic contracts 16 and 17.

The flange shell 4 and the receptacle shell 5 are secured together by means of a threaded coupling ring 54, which assembly also serves to fixedly secure all of the internal components of the receptacle assembly. Within the core of the insert 7, and in fixed orientation, is secured the interface shaft guide post 8. This guide post 8 is mounted with Camming pegs 9, which are functionally engaged to corresponding camming slots 10, which slots in turn are features of the shaft of the receptacle interface plate 2. Moreover, the exterior surface of the receptacle interface plate 2 is covered with a thin, lowdurometer, elastomeric gasket 65, to function as an interfacing seal, when engaged to the corresponding surface of the plug interface plate 1

Mounted within the insert 7 is an array of electric contacts 17, which are secured and sealed into the flange shell 4 by means of a threaded interface and electric sealing boots 19 and/or mounted within the insert 7 is an array of optical contacts 16, which are secured and sealed into the flange shell 4 by means of optical strain relief boots 18. A multiplicity of such contacts can be coincidentally arrayed within this assembly, in any combination. Moreover, each functional interconnection area of either the electric 17 or optical 16 contacts is enshrouded within an independent contact isolation membrane 15, as a component of a sub-assembly which also includes at the forward end, a push-seal component 58. When the receptacle assembly is in the dis-mated condition, this push seal 58 serves to isolate the internal contact cavity from the forward, fluid-filled cavity located directly behind the receptacle interface plate. During the mating process, the forward end of each push-seal 58 is so configured so as to permit penetration by either type of intruding plug contact whether an electric contact 36 or an optic contact 38.

Finally, by various configurations of channeling within the components of the receptacle assembly, the fluid-filled cavities of the said assembly are made to communicate with the internal surface of a main bellophragm-type pressure compensation element 13. The external surface of this pressure compensation element 13, is made to communicate with the environmental seawater via radially configured channels through the walls of the flange shell 4, and then through, and around the assembly Coupling ring 54. a measure of contaminant filtering of the surrounding seawater, during the compensation "breathing" process is achieved by means of a filter Band 55, installed as a component of the assembly Coupling ring 54.

In the dis-mated condition, the scalloped receptacle interface plate 2, is firmly seated within a correspondingly profiled, scalloped aperture at the interface end of the receptacle shell 5, and is held secure in this closed and sealed condition under the motivation of the interface plate spring 11, which surrounds the centrally located interface shaft guide post 8. Environmental sealing between the scalloped profile of the receptacle interface plate 1, and the corresponding seating surface of the receptacle shell 5 is further aided by a peripheral sealing gasket 20.

An elastomeric Band 57 is made a component of the Threaded Coupling ring 54, in such manner as to serve as a contaminant sealing device, when the plug and receptacle assemblies are fully mated. The manner of this sealing function is clearly evident in the bottom-most longitudinal section view (fully mated view) of FIG. 2b.

Plug Assembly

With reference to FIG. 2a, and more specifically to the longitudinal section view of the plug assembly, in one embodiment, the internal mechanisms of the plug assembly are supported by a surrounding plug shell 21.

Secured within the plug shell 21, by means of threaded fasteners is the insert assembly, which insert assembly is secured within the plug shell 21, in fixed and precise orientation with regard to the plug/receptacle alignment peg 26, so as to assure precise alignment of the plug contact array, with the corresponding receptacle contact array, during the connector set mating procedure. Moreover, an intermediate supporting structure consisting of an insert shell 3 is installed concentric to the insert assembly, in such manner that the insert shell 3 is free to travel only in an axially aligned manner with respect to the plug shell 21. The insert assembly is free to travel within the insert shell 3, only in a precisely axial manner, and within predefined longitudinal limits. Moreover, the forward end of the insert shell 3 is fitted with an insert shell Cap 66, which aids in the retention of internal components, provides positional support for the plug assembly Contacts 36 and 38 and serves as a facilitating means for product assembly.

Figure 2E:
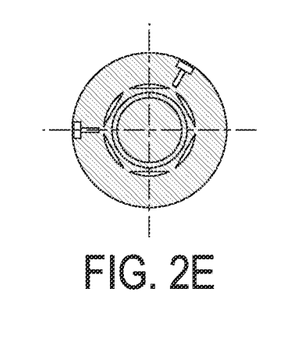
FIG. 2e illustrates one embodiment of a transverse section view of the plug, which principally describes the contours and interface relationship between the plug shell and the insert shell.
Figure 2F:
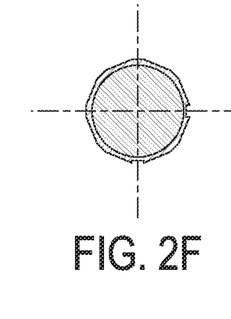
FIG. 2f illustrates of one embodiment of a transverse section view of the receptacle shell, taken particularly to describe the octagonal profile geometry of the said shell.
Figure 2G:
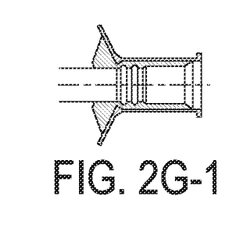
Figure 2G:
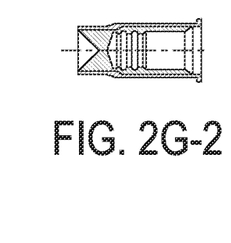
Figure 2H:
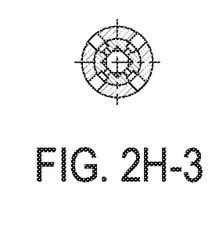
Figures 2H, 2H, 2H:
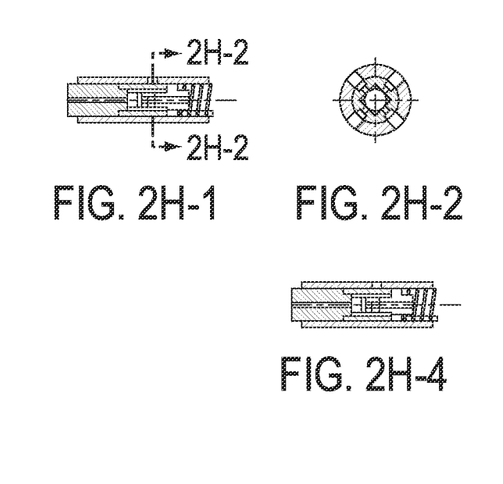

FIG. 2e, which depicts a transverse section (section C-C) taken through the body of one embodiment of the plug assembly, describes the interface relationship between the external surface of the insert shell 3 and the bore of the plug assembly compensator mounting ring 41, which in turn is installed within the plug shell 21. This interface can be entirely exposed to seawater environment, as well as to sand, silt, and other sea-floor contaminants. In the illustrated embodiment, the external profile of the insert shell 3 is characterized by a polygonal geometry, which rides within a cylindrical bore, so as to provide an interface configuration that is least prone to contaminant degradation, to binding or to failure during normal operation in the presence of such conditions.

In the illustrated embodiment, a tubular, corrugated, elastic, environmental isolation Bellows 32 is fixed and sealed at the rear of the insert shell 3, while at the other end of the said environmental isolation Bellows 32 the said bellows is fixed and sealed to the rear segment of the insert assembly. This assembled configuration yields an internal sub-assembly mechanism that is sealed against all environmental conditions, and is provided with automatic pressure/temperature compensation, and for any consequent variations of internal fluid volumes.

Moreover, the environmental isolation Bellows is simultaneously capable of handling the radical changes in volume that will be experienced during the complete cycles of mating and dis-mating of the connector set. The external surface of this isolation Bellows 32 is provided access to environmental seawater by means of venting holes 34 through walls of the plug shell 21. Additional temperature/pressure fluid-volume compensation is provided by means of six compensation elements 29, installed into the body of the insert shell 3, as illustrated both in the longitudinal section view of the plug assembly, and in the transverse section (C-C), FIG. 2e. Effective venting 30, for the proper operation of these compensation elements 29, is also depicted in these section views.

The insert assembly, as above described, is principally composed of an insert 22, an array of plug assembly electric contacts 36, and/or an array of plug assembly optical contacts 38. The plug assembly electric contracts 36 are secured into the rear of the insert 22 by means of electric contact boot seals 37. The plug assembly optical contracts 38 are secured into the rear of the insert 22 by means of optical contact strain relief boot assemblies 39. Within the bore of the insert 22, an insert sleeve 25 is fixedly attached, which insert sleeve 25 is also provided with an array of "L"-shaped slots 28. These "L"-slots 28 are correspondingly engaged by a mating set of "L"-slot pegs 27, which "L"-slot pegs 27 are made to be fixed components of the Valve Body 23, which Valve Body 23 is a press-fitted component affixed onto the end the shaft portion of the plug interface plate 1.

Under the compressed motivation of a shaft spring 33, a shaft spring Cap 24, which also serves as a component of a fluid-venting valve assembly, is fitted into the end of the valve body, through a thrust bearing 65 that enables a low-friction rotational relationship between the shaft spring cap 24 and the valve Body 23. As described below, the "L"-slot pegs 27 in relation to the "L"-slot features 28 of the insert sleeve 25, provide the means by which the plug interface plate 1 is retained in its proper axial and radial positions, and is securely seated, into the scalloped aperture at the interface end of the of the insert shell Cap 66, under the influence of the interface plate spring 62.

In the same manner as the "L" slot pegs 27 and "L" slot features 28 serve to define the proper orientation of the plug interface plate shaft 1, so too does the guide Block 63, which is affixed to the shaft spring Cap 24, maintain the proper orientation of that shaft spring Cap 24, in relation to the Valve Body 23 and to the plug interface plate shaft 1, to which the Valve Body 23 is fixedly attached. This orientation is governed by the continuous location of this guide Block 53 within an "L" slot feature 28. During their press-fitted assembly, proper relative orientation of the Valve Body 23 and the plug interface plate shaft 1, is assured by means of an alignment pin 64.

Housed within the insert sleeve cap 66, is an array of push seal elements 14, which serve as alignment guides for all of the electric and/or optic plug assembly contacts 36 and 38, and as a means of fluid isolation between the fluid-filled cavity located directly behind the plug interface plate 1, and the fluid-filled cavity within the insert sleeve 25. These push-seal elements 14 are so configured as to allow for their penetration by advancing plug assembly contacts, while maintaining their sealing qualities. Moreover, the design of the push-seal elements 14 is such as to also provide a wiping or cleaning action, during penetration, to assure that contaminants which might develop within one fluid-filled cavity, will not be transferred to the adjacent fluid-filled cavity.

Coupling Mechanism

Figure 3A:
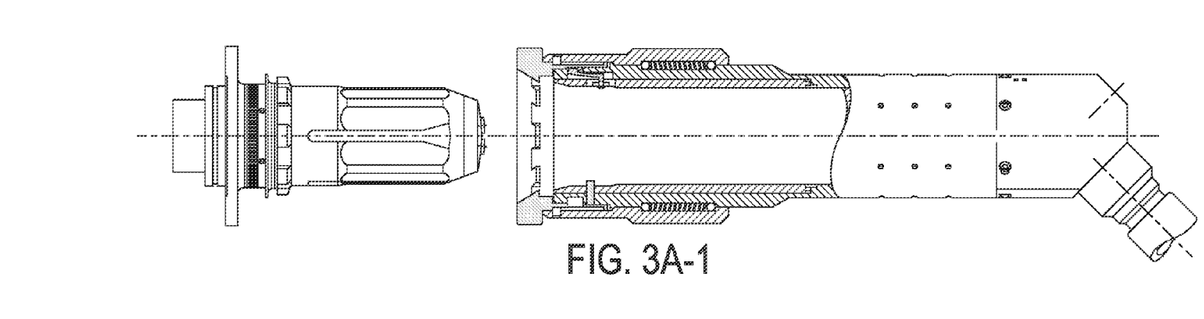
Figure 3A:
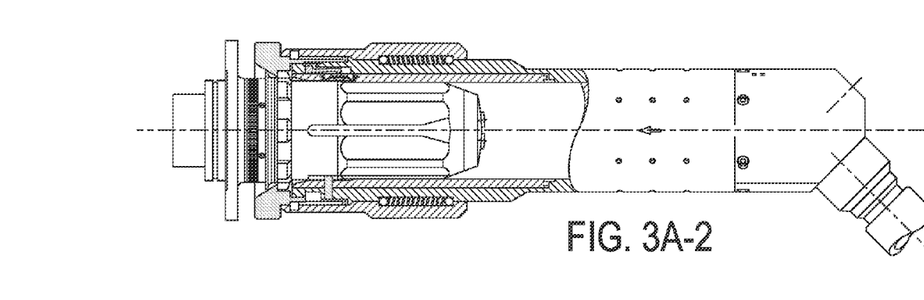
Figure 3A:
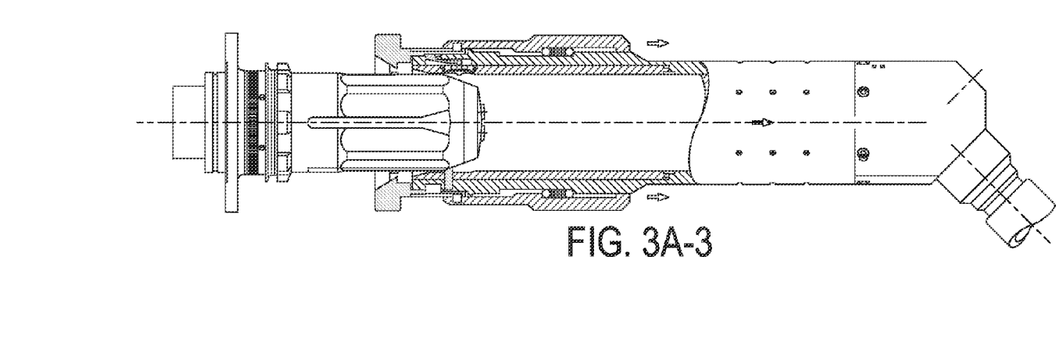
Figure 3B:
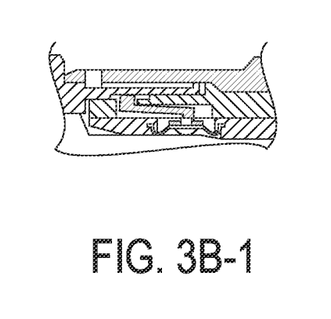
Figure 3B:
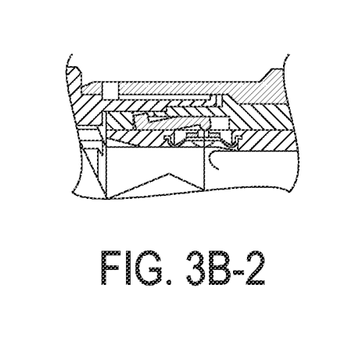
Figure 3C:
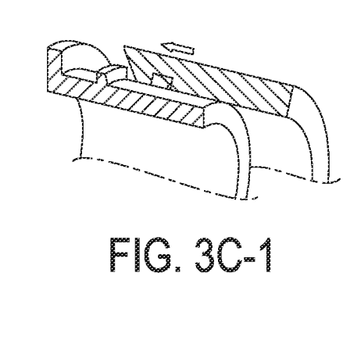
Figure 3C:
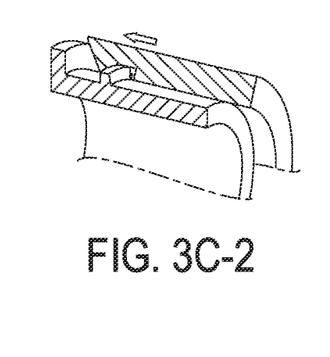
Figure 3C:
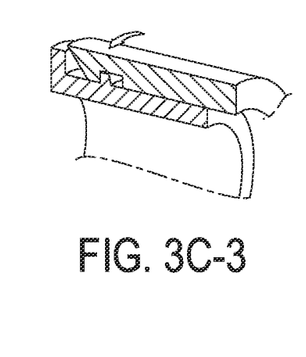
Figure 3D:
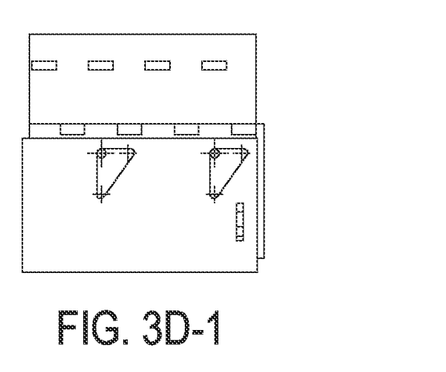
Figure 3D:
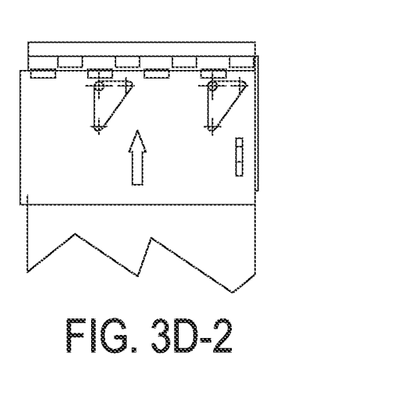
Figure 3D:
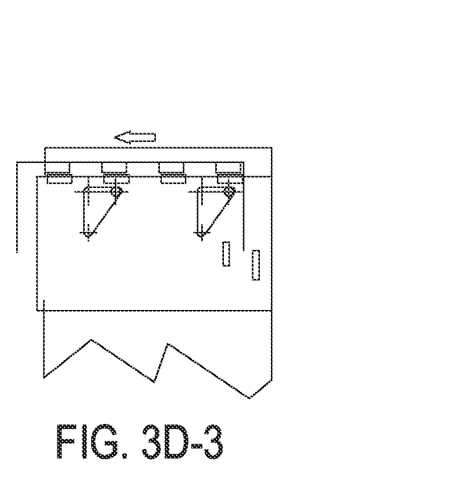
Figure 3D:
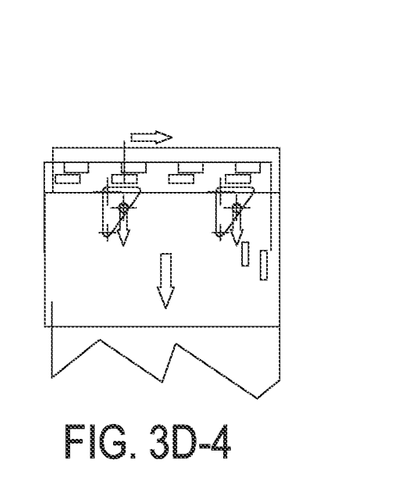

The top-most illustration of FIG. 3a, is a longitudinal section view of one embodiment of a coupling ring mechanism, which identifies all of the significant components of the system, and their positioning in relationship to each other. The plug shell 21 comprises the foundation of the mechanism, onto the end of which is mounted the principle engagement element, the castlated ring 51. The castlated ring 51, in turn, is secured to the plug assembly by means of the retaining peg/s 52, which retaining pegs 52 are press-fitted into the castlated ring 51, so as to protrude into a groove feature of the plug shell 21. The groove/s feature of the plug shell 21 is configured to permit a rotational motion of the castlated ring 51 of up to a limit (in this example) of 30 degrees.

A Coupling ring 6 is installed over the castlated ring 51, and is secured by the installation of a press-fitted camming peg 48, which camming peg 48 is made to intrude into the area of a camming groove feature of the castlated ring 51. This coupling ring 6 is further secured, and regulated in its range of motion, by a castlated ring-mounted guide pin (not shown), which intrudes into a longitudinal groove (also not shown) cut into the outer surface of the plug shell 21. The installation of the Coupling ring 6 is coincident with the installation of an array of return spring mechanisms 40, which are so configured as to retain the Coupling ring 6 in the forward-most attitude, except when retracted under the influence of an external force.

At appropriate locations of an inner diameter of the Castlated ring 51, a Latching slot feature 50 is provided, which feature can be engaged by a rocking latch 46, in such manner as to lock the rotational position of the castlated ring 51. When the rocking latch 46 is activated by an upward displacement of the actuator pin 42, the rocking latch 46 is made to retract from the latching slot feature 50, to thereby release the rotational position of the castlated ring 51, to then allow the said castlated ring 51 to reposition to a different orientation.

Activation of the rocking Latch 46 by the actuator pin 42 causes the rocker Latch 46 to compress against the Latch spring 47, so that when the Castlated ring 51 is again oriented so that the Latching slot feature 50 is properly aligned, the rocker Latch 46 can once more engage same, to again fix the oriented position of the Castlated ring 51. As shown in the FIG. 3b, and in the center illustration of FIG. 3a, upward displacement of the actuator pin 42 is made to occur upon complete seating of the receptacle assembly into the plug assembly. This function is accomplished through a precise configuration of the receptacle shell 5 profile, in relation to correspondingly precise dimensioning of the mechanical interface geometry of the plug assembly and its internal mechanisms.

In order to protect the functionality of the latching mechanism from the hazards of seawater and of sea floor contaminants, the actuator pin 42 is mounted into the center of a taut, elastic diaphragm 44, and is secured in its installation by means of an actuator retainer ring 43. The diaphragm 44, in turn, is fixedly installed into a compensator mounting ring 41, by means of a diaphragm retaining ring 45. The fully assembled diaphragm retaining ring 45 is then fitted into the forward bore of the plug assembly, and is precisely oriented in its installation by means of locating pins 49. This installation is then secured by installation of two plug/receptacle alignment guide pegs 26.

Coupling Ring Operational Sequence

A feature of one embodiment of the locking ring coupling mechanism is the array of castlated teeth which are provided as an external element of the receptacle shell 5 profile, and the correlated array of internally featured castlated teeth within the forward bore of the Castlated ring 51 component of the plug assembly. FIG. 3a provides a simplified representation of the manner in which the castlated teeth of the plug-mounted Castlated ring 51, are made to approach, and then engage, the array of castlated teeth which are a component feature of the receptacle shell 5.

The complete sequence of operations which define the overall function of one embodiment of a coupling system is represented in the stylized sequential diagrams of FIG. 3d. The last diagram to the right, illustrates how a physical retraction of the coupling ring 6 of the plug assembly (when the said plug assembly is dis-mated from its mating receptacle assembly) is made, by means of a camming action, to rotate the castlated ring 51 until, the full retraction of the said coupling ring 6 causes the latch slot feature/s 50, within the bore of the castlated ring 51 to align with the spring-loaded Latchs 46.

Upon alignment of the Latch/s 46 with the Latch slot features 50 of the castlated ring 51, the said Latch 46 engages into the said slot feature 50, to hold the rotational attitude of the Castlated ring 51 fixed, against the force of a compressed spring (not shown) housed in the interface between the bore of the castlated ring 51, and the outer surface of the plug shell 21. This fixed orientation of the castlated ring 51, (locked against the force of a compressed spring), is the normal condition of the coupling mechanism whenever the plug assembly is dis-mated from its corresponding receptacle assembly. This condition of the coupling mechanism is described in the first (left hand) diagram of FIG. 3d, in which it is further depicted that the castlation teeth of the castlated ring 51, are able to pass between the array of castlation teeth of the receptacle, as will occur in the process of mating the plug and receptacle assemblies.

The second diagram of FIG. 3d describes the instant of complete mating of the plug and receptacle assemblies, at the precise moment when the ramped contour of the receptacle shell 5 has fully displaced the actuator pin 42, and through the action of that actuator pin 42, has caused the displacement and retraction of the rocking Latches 46 from the slot features 50 of the Castlated ring 51. Release of the rocking latchs 46 enables the castlated ring 51 to rotate, under the driving force of the noted spring, to cause the castlation teeth of the castlated ring 51 to engage directly behind the castlation teeth of the receptacle shell (5. it will be noted from this diagram that the engaging surfaces of the castlation teeth of the castlated ring 51, and the castlation teeth of the receptacle shell 5 are ramped, in the fashion of "segments of a screw thread". Such ramped engagement guarantees perfect axial linkage of the mated plug and receptacle assemblies, without the possibility of "mated spring-back".

The third diagram of FIG. 3d described the attitude of all of the principle components of the coupling Mechanism, in the fully mated condition, and in particular it illustrates the camming peg 48 as a component of the coupling ring 6, in relation to the triangular camming slot feature/s of the castlated ring 51. in this attitude, camming pegs 48 are perfectly positioned to cam the castlated ring 51 into full dis-engagement mode, whenever the coupling ring 6, is next retracted under the influence of an external force.

Finally, it will be noted from the longitudinal section views of FIG. 3a that the forward geometry of the castlated ring 51 is configured as the principle interfacing surface of the complete plug assembly, and that as such, is provided with sufficient bulk and mass to tolerate the aggressive handling conditions which are to be anticipated for a mechanism in this type of service. Moreover, the castlated ring 51 is configured with an exaggerate coned entry, to facilitate successful engagement of this plug assembly with its mating receptacle assembly, even under conditions of moderate misalignment and/or moderate deviations in angle of entry, which are likely to occur when such mating is to be performed by remote mechanical aids, such as a conventional undersea ROV.

Plug Receptacle Mating Sequence

FIG. 2b provides a series of longitudinal section views of one embodiment of both the plug and receptacle assemblies, which views describe the sequential behavior of the internal mechanisms of this connector system during the entire engagement process. The top-most illustration describes a fully dis-mated connector set, showing the quiescent condition of all internal components.

The second section view illustrates the initial interface contact of the plug and receptacle assemblies, and describes the manner in which raised features on the receptacle interface plate 2, engage into corresponding recessed features of the plug interface plate 1, which features are made to be completely identical in position and contour. These interface features can provide a means by which to securely fix the plug interface plate 1 and the receptacle interface plate 2 together so that their orientation, relative to each other will be held coincident throughout the connector set mating process. This section view further demonstrates that upon initial contact, the receptacle shell 5 of the receptacle, which is the forward-most structural component of the receptacle, and the insert shell cap 66 of the plug assembly, are in direct contact, and will remain so throughout the mating process.

The third section view in the series describes the effects of the initial compressive force as it is applied to the engagement of the plug and receptacle assemblies. Upon application of this force, the travel of the compensator mounting ring 41, within the plug shell 21, over the receptacle shell 5, immediately applies a corresponding force, within the plug assembly, directly to the rear of the environmental isolation Bellows 32 and to the interface shaft spring 33. Since the plug insert shell cap 66 is in constrained contact with the receptacle shell 5, this compressive force acts to directly compress the environmental isolation Bellows 32. The same force, being applied to the rear of the interface shaft spring 33, however, is made to motivationally displace the plug interface shaft 1, by acting through its related components, the shaft spring cap 24 and the valve body 23.

Since the plug interface plate 1 (and its integral shaft) are in firm contact with the receptacle interface plate 2, both interface plates are coincidentally made to displace directly into the forward cavity of the receptacle assembly. The coincident axial movement of the receptacle interface plate 2 causes its integral shaft, within the core of the receptacle assembly, to act and compress against the receptacle interface spring 11, which is substantially weaker than the plug shaft spring 33. The receptacle interface spring 11 is installed directly over and around the interface shaft guide post 8. As stated earlier, this guide post 8 is fixedly attached to the base structure of the receptacle assembly, and has mounted to it, an array of Camming pegs 9. Also as described earlier, these camming pegs 9 are engaged into a corresponding array of camming slot features 10, which are an integral feature of the shaft of the receptacle interface plate 2, which shaft is also made to slip-fit over, and to slide along, the guide post 8.

The shaft is constrained in its motion along and around the guide post 8 by the limitations of the camming slot features 10 of the shaft, and the related camming pegs 9, which are affixed to the guide post 8. As the shaft portion of receptacle interface plate 2 is made to travel into receptacle assembly, the effect of the camming pegs 8, which act within the camming slot features 10 of the shaft of the receptacle interface plate 2, is to cause the said receptacle interface plate to rotate through a predefined orientational angle. The configuration of the camming slot feature 10, during this motion, serves both to limit the specific length of travel of the two joined interface plates, and to effect a controlled rotation of the two joined interface plates to an exact rotational excursion.

Since this initial motion of the plug interface plate 1 is locked and coincident to the motion of the receptacle interface plate 2, the traveling rotation of the shaft of the receptacle interface plate 2 imposes a coincident traveling motion on the shaft of the plug interface plate 1. It will further be noted from the third illustration of FIG. 2b that the insert 22 within the plug assembly, as well as the array of electric plug assembly contacts 36 and the array of optical plug assembly contacts 38, are all mechanically secured to the plug shell 21, and that therefore the insert and Contact arrays must all move coincidently with the motion of the plug shell 21.

A comparison between the second and third illustrations shows that in the second illustration, the forward ends of all of the plug assembly contacts were confined within an array of push seals 14, which seals populate an internal web of the insert shell Cap 66. The initial function of these push seals 14 is to provide isolation between the forward and central fluid cavities of the plug assembly, so as to reduce or eliminate the migration of potentially contaminated fluids. This constraint upon potential migration of such contaminants minimizes potential interfere with the proper function and performance of either the electric plug assembly Contacts 36 and/or the optical plug assembly Contracts 38.

The third illustration of FIG. 2b shows that the initial forward travel of the joined interface plates and related components, was also coincident with the forward motion of the complete array of the plug assembly Contracts. Moreover, since the insert shell 3 was constrained from any further forward motion, the entire array of electric plug assembly Contacts 36 and optical plug assembly contacts 38 was made to pierce through their related push seals 14. In one embodiment, these seals are designed with elastomeric cores, and are segmented at the forward end, so that they remain closed and effectively fluid tight in their normal state, but can readily be pierced by components which are small, circular and of smooth profile, which components can readily be made to flare the forward segments, in the process of their penetration.

The initial travel of the joined interface plates and the array of plug assembly contacts are limited by the length of the camming slot features 10 within the receptacle assembly. Moreover, through the geometry of the Camming slot features 10, this travel yields a controlled rotation of the joined interface plates, so that the crests of the scalloped periphery of the interface plate profiles, no longer obstruct the forward motion of the any of the advancing plug assembly contacts.

Referring once more to a comparison between the second and third illustrations of FIG. 2b, it will be seen that in the second illustration, the "L"-slot pegs 27 are seated at the crest of the short leg of the "L" slot features 28, which features are a part of the insert sleeve 25, which sleeve is fixedly attached to the bore of the insert 22. As previously stated, the insert 22 is mechanically fixed to the basic plug assembly structure, i.e. the plug shell 21. Thus, as depicted in the second illustration of FIG. 2b, the axial motion of the joined interface plates, as well as their shafts and associated components, is restricted to motion coincident with that of the plug shell 21.

It will further be noted in the third illustration of FIG. 2b, that when the initial axial travel of the joined interface plates, as well as their shafts and associated components, has reached its limits, as defined by the camming slot features 10 within the receptacle assembly, that action of the camming slot features 10 has also caused a consequent rotation of that entire chain of components, including the positioning of the "L" slot pegs 27, which pegs 27 as a result of rotation, are now given access to the long, axial leg of the "L" slot features 28 within the insert sleeve 25. This re-alignment of the "L" slot pegs 27, in relation to the associated "L" slot features 28 within the insert sleeve 25 now yields a potential for further travel of the plug shell 21, and its related components, beyond the controlled and limited travel of the joined interface plates and their associated components.

The final length of compression between the plug and receptacle assemblies causes engagement and automatic locking of the Coupling ring mechanism, as described earlier in this disclosure. A further effect of this final length of travel, is represented in the fourth (bottom) illustration of FIG. 2b, in which is shown the total extent of travel of the complete plug assembly contact array, to the point where full penetration of the said plug assembly Contact array into the complete array of receptacle assembly contacts is achieved, within the body of the receptacle assembly. The fourth illustration of FIG. 2b also shows that during the excursion of the plug assembly contact array, each plug assembly contact is made to pierce a push seal element 58. Each of these push-seal elements 58, is designed to isolate the principle fluid-filled cavities of the receptacle assembly, from the individual fluid-filled cavities of each receptacle contact area. Moreover, a feature within each contact isolation shroud 15 also serves to wipe and clean the penetrating plug assembly contact of any potential contaminants, prior to the physical seating of the said contact. Each Contact isolation shroud 15 is provided with an elastic membrane which enables the displacement of fluid within the shroud 15 to be translated into a displacement of the coincident volume directly to the volume of the surrounding fluid within the principle cavities of the receptacle assembly.

Fluid Venting and Temperature/Pressure Compensation

As discussed above, in one embodiment, the cavities within the plug and receptacle assemblies are filled with an appropriate fluid as a principle element for pressure compensation, i.e. as a medium that would maintain an equilibrium of pressure within the connector set cavities to be coincident with variations in the pressure of the surrounding environment. As an aid to this compensation means, elastic membranes, bellows and the like are also provided in the walls of the receptacle and plug outer structures, to act as resilient interface barriers. In general, this resilient interface barrier not only aids in accommodating variations in environmental pressure, but also relieves volumetric changes within the connector set chambers, which may result from thermal expansion or contraction of the pressure compensating fluid. In addition to accommodating volumetric changes due to variations in temperature and pressure, the resilient barriers provided in the structure of this connector set, have been made elastic enough to handle the much greater volumetric changes which occur during the mating and dis-mating procedures during which significant compression and expansion of the internal cavities are made to happen.

Considerable circulation of the compensating fluid is made to occur throughout the various cavities within the system. In addition, this circulation of fluids between cavities is rendered even more complex by the fact that when the plug and receptacle assemblies become physically engaged, and the joined interface plates are made to displace into the forward cavity of the receptacle assembly, the forward cavities (mechanical interface cavities) of both the plug and receptacle assemblies effectively become a single cavity . . . with common fluid content.

Moreover, the physical action of joining the plug and receptacle interfaces introduce trace amounts of environmental contamination into the system fluids. furthermore, each subsequent action of mating and dis-mating must nominally add to this level of foreign contamination. Finally, mechanical wear and similar factors must also add trivial amounts of other kinds of contaminants to the total. This incremental buildup of fluid contamination need not necessarily degrade the overall performance of this connector system, provided that the corrupted fluids are not permitted to interfere with the performance and/or functionality of either the electrical or optical contact junctions. For this reason, it is a feature of at least one embodiment of the present invention to maintain a high degree of isolation in regard to the fluid flow between various cavities within the system, and in particular, the junctions of electrical and optical interfaces, in the area of the receptacle assembly contacts within the receptacle assembly.

To satisfy these requirements, it will be noted (FIG. 2b) that within the receptacle assembly, each receptacle contact is provided with an independent elastic seal 15 which, in conjunction with its associated push seal 58 provides an isolated fluid environment, which is protected from the effects of potentially contaminated fluids of the surrounding cavity. Then too, with reference to the plug assembly, it will be noted that in the area of the plug assembly contact extensions (forward of the insert 22), that no communication of fluid is permitted to other cavities of the connector system, and that an independent means of volumetric compensation is provided, at six places, in the walls of the insert sleeve 3.

Again with reference to the plug assembly (FIG. 2b), it will be noted that in one embodiment of the plug assembly a channel of fluid communication is provided, through the shaft of the plug interface plate 1 to the cavity surrounded by the environmental isolation Bellows 32. However, it should also be noted (FIG. 2b), that at the end of the shaft of the plug interface plate 1 a valve mechanism has been added. This mechanism, consisting of the shaft end of the plug interface plate 1, the valve body 23, which is press-fitted to the end of the shaft, and the shaft spring cap 24 is positioned to regulate access between the forward-most and rear-most cavities of the plug assembly. The shaft spring Cap 24 is so configured that its motion within the insert sleeve 25 is limited to axial motion only. This limitation is achieved by having provided a guide block 63, which is fixedly attached to the shaft spring Cap 24, and is made to fit into the longitudinal leg of an "L" slot feature 28 of the insert sleeve 25.

By means of the guide Block 63, which is made to ride within the longitudinal leg of an "L" slot feature 28, the motion of the shaft spring Cap 24, during the mating and dis-mating procedures, is limited to axial travel only. as can be seen in FIG. 2h, that since the shaft spring Cap 24 is constrained from rotation, the rotation of the valve body 23, automatically seals or unseals access of fluids from the radial channels within the Cap. By this means exchange of fluid is possible between the forward-most and rearmost cavities of the plug assembly, but only during a portion of the initial travel of the joined interface plates. as the cammed rotation of the interface plates is made to occur, as previously described, the shaft of the plug interface plate 1 is also made to rotate, carrying with it the press-fitted valve body 23, so that upon complete mating of the connector set, the valve is made to constrain fluid venting between the forward and aft cavities of the plug assembly.

While various embodiments have been described for purposes of this disclosure, such embodiments should not be deemed to limit the teaching of this disclosure to those embodiments. Various changes and modifications may be made to the elements and described above to obtain a result that remains within the scope of the systems and methods described in this disclosure.

I claim:

1. A connector set comprising:
a plug having a front oil chamber in series with a secondary oil chamber having electrical or optical contacts;
a receptacle having a front oil chamber in series with a secondary oil chamber having electrical or optical contacts, the receptacle being adapted to receive the plug,
wherein the front oil chamber in the plug and the front oil chamber of the receptacle are configured for mechanically engaging the plug and the receptacle, and the secondary oil chamber in the plug and the secondary oil chamber in the receptacle are configured for isolation and contact engagement of the electrical or optical contacts of the plug with the electrical or optical contacts of the receptacle.

2. The connector set of claim 1 wherein the front oil chamber of the plug is separated by an interface barrier from the secondary oil chamber of the plug and the front oil chamber of the receptacle is separated by an interface barrier from the secondary oil chamber of the receptacle.

3. The connector set of claim 1 wherein the front oil chamber of the plug is separated by an interface barrier from the secondary oil chamber of the plug such that ingress of contamination into the secondary oil chamber of the plug is prevented, and wherein the front oil chamber of the receptacle is separated by an interface barrier from the secondary oil chamber of the receptacle whereby ingress of contamination into the secondary oil chamber of the plug is prevented.

4. The connector set of claim 2 wherein the front oil chamber of the plug is in series alignment with the secondary oil chamber of the plug such that contact passage is made through the front oil chamber of the plug, and wherein the front oil chamber of the receptacle is in series alignment with the secondary oil chamber of the receptacle such that contact passage is made through the front oil chamber of the receptacle.

5. The connector set of claim 1 wherein the front oil chamber of the plug and the front oil chamber of the receptacle are each separated by an interface barrier respectively from the secondary oil chamber of the plug and the secondary oil chamber of the receptacle so as to form dedicated and sealed mechanical engagement chambers in the plug and the receptacle prior to engagement of the plug and the receptacle.

6. The connector set of claim 1 wherein the front oil chamber of the plug and the front oil chamber of the receptacle are each separated by an interface barrier respectively from the secondary oil chamber of the plug and the secondary oil chamber of the receptacle so as to form dedicated and sealed contact chambers prior to engagement of the plug and receptacle.

7. The connector set of claim 2 wherein the front oil chamber of the plug and of the receptacle become a contiguous mechanical engagement chamber upon or following engagement of the connector halves while remaining separated by an interface barrier from the secondary oil chamber of the plug and the secondary oil chamber of the receptacle.

8. The connector set of claim 6 wherein, when the plug and the receptacle are engaged, isolation of the contact chamber in the plug and the contact chamber in the receptacle from a contiguous mechanical engagement chamber of the engaged plug and receptacle reduces contamination of the secondary contact chamber of the plug and of the receptacle.

9. The connector set of claim 7 wherein dedicated in-series mechanical engagement chambers reduce secondary contact chamber contamination levels.

10. The connector set of claim 4 wherein interface valves isolate a mechanical engagement chamber of the plug and a mechanical engagement chamber of the receptacle prior to engagement of the plug and of the receptacle.

11. The connector set of claim 10 wherein the interface valves rotate upon connector engagement so as to provide reduced engagement stroke of the connector.

12. The connector set of claim 10 wherein secondary seals of the plug and the receptacle separate the front oil chamber from the secondary oil chamber of the plug and receptacle respectively, thereby reducing contamination in the secondary contact chamber.

13. The connector set of claim 12 wherein the secondary seals are actuated through contact with a corresponding contact and prevent oil transfer from the secondary contact chamber to the mechanical engagement chamber during actuation of the secondary seals.

14. The connector set of claim 12 wherein the secondary seals each provide isolated front oil chambers that are separate from the secondary oil chambers within the plug and the receptacle, respectively.

15. The connector set of claim 14 wherein the secondary seals are configured as a single seal element with multiple entries.

16. The connector set of claim 1 wherein the front oil chamber and the secondary oil chamber of the plug and the front oil chamber and the secondary oil chamber of the receptacle each enclose separate and isolated oil volumes.

17. The connector set of claim 10 wherein connector oil volumes in the plug and the receptacle, respectively, are contiguous upon or following engagement of the plug and receptacle, whereby oil transfer between primary and secondary oil volumes is prevented.

18. The connector set of claim 11 wherein the interface valve of the plug also contains an automatic shut-off valve that is actuated during engagement.

19. The connector set of claim 18 wherein the automatic shut-off valve is configured to inlet additional oil to the mechanical engagement chamber during engagement then isolate the mechanical engagement chamber following engagement of the plug and receptacle.

\* \* \* \* \*